E. RÜEGGER.
DEVICE FOR THE GAS TIGHT SEALING OF THE COVER OF A VESSEL.
APPLICATION FILED NOV. 11, 1914.

1,246,164. Patented Nov. 13, 1917.

UNITED STATES PATENT OFFICE.

EDUARD RÜEGGER, OF ZURICH, SWITZERLAND, ASSIGNOR TO AKTIENGESELLSCHAFT DER MASCHINENFABRIKEN ESCHER WYSS & CIE., OF ZURICH, SWITZERLAND, A FIRM.

DEVICE FOR THE GAS-TIGHT SEALING OF THE COVER OF A VESSEL.

1,246,164.     Specification of Letters Patent.     Patented Nov. 13, 1917.

Application filed November 11, 1914. Serial No. 871,532.

*To all whom it may concern:*

Be it known that I, EDUARD RÜEGGER, a citizen of the Republic of Switzerland, residing at Zurich, Switzerland, have invented new and useful Improvements in Devices for the Gas-Tight Sealing of the Cover of a Vessel; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

The invention relates to improvements in processes and devices for the gas-tight sealing of the cover of a vessel. According to same the process consists in calking a metal wire into a tapered joint formed between the wall of a vessel and its cover which is to be made gas-tight, and in filling the space outside of this metal wire with solder.

The device provides a joint formed by the wall of a vessel and its cover, the form of the upper part of the cross-section of this joint being tapered toward the inside of the vessel, a metal wire calked into the so formed upper part of the joint, the space outside of this metal wire being filled with solder.

Figure 1:
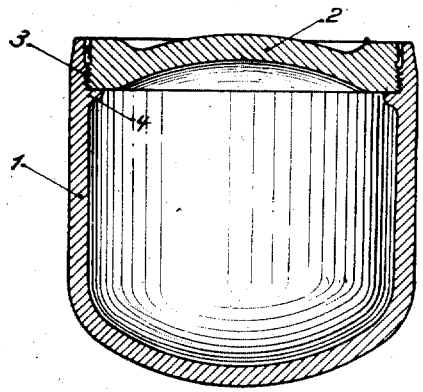

A clearer understanding of what is included in this improvement may be obtained by reference to the annexed drawing sheet, where in Figure 1 is shown the cross-section through a vessel 1, which is to be sealed by means of cover 2.

Figure 2:
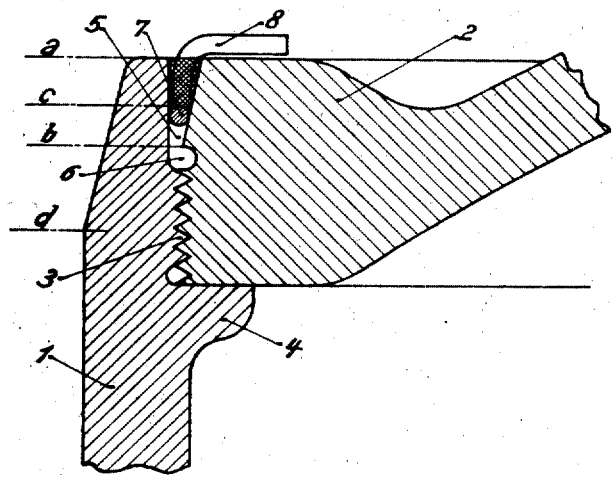

In Fig. 2 the connection and the packing between body and cover is shown to a larger scale. First, the cover 2 is screwed down to the rim of the vessel 1, by means of thread 3, till it rests on shoulder 4. The thread 3 extends only on the lower half of the cover-rim. Above the thread 3, the tapered groove 5, which narrows toward the interior of the vessel, is formed through the fitting together of the upper half of the vessel-rim, and the upper half of the cover-rim. The drawing shows at 6, a groove in the cover, which is rounded at the bottom, in order that the thread 3, on the cover, may be abruptly discontinued. The chief point, however, is, that the groove 5, between the level $a$ and the level $b$, is steadily narrowed conically. Into this groove a metal wire 7 is calked, the length of which should be at least somewhat greater than the circumference of the cover, measured at the groove. The remaining space in the groove above the metal wire 7, i. e. the part of the groove between the surfaces $a$ and $c$, is filled with solder.

In order to facilitate the opening of this sealing device, the end 8 of the wire 7 is brought outside, bent over the rim of the cover and hammered down, as shown in Fig. 2.

To loosen the cover of the vessel, the end 8 of the wire 7 should be gripped with a pair of pliers or a special spanner, and the wire wound off the whole length of the groove, by which means the solder would be drawn out of the groove with the wire 7. The cover 2 can then be screwed out by means of the thread 3.

This sealing device has great advantages. Since the wire 7 is calked into the conically constructed groove 5, it keeps its initial tension, and thus the upper rim of the vessel 1 from $a$ to $a$ remains in a stressed condition. If, now, in consequence of the high pressure in the interior of the vessel, the upper rim of same is pressed somewhat outward, its distance from the cover will somewhat increase the tension in the rim of the vessel opposite the cover due to the action of the wire calked into the groove 5 being thereby somewhat reduced, but not totally removed, so that the groove between the cover 2 and vessel 1 is not opened. The solder over the wire 7 will therefore remain intact, adhering both to cover 2 and also vessel 1. The joint always remains tight. The wire 7 calked into the groove 5 further prevents the solder poured into the groove from going deeper than this wire, and renders, as above described, the possibility of easily removing the solder in the event of the cover having to be taken off. As shown in Fig. 2, the cross-section of the vessel-rim may be reduced on the outside from the level $d$ to the level $a$, thereby assuring to the rim of the vessel the desired flexibility.

Having now particularly described and ascertained the nature of my said invention and in what manner the same is to be performed, I declare that what I claim is:

1. In a device for a gas-tight sealing of the cover of a vessel, a vessel, a cover forming with the rim of the vessel an annular groove having a cross section tapering toward the inside of the vessel, and a metal wire calked into the upper part of the said groove and consequently under lateral pressure makes a tight closure in this groove, the space outside of the metal wire being filled with solder.

2. In a device for the gas-tight sealing of the cover of a vessel, a vessel provided with a rim having an inner side straight in its upper part and screw-threaded in its lower part, a cover having a conical upper and a screw-threaded lower part screwed down to the rim of the vessel, the straight inner rim part and the conical cover part forming an annular groove, the upper part of the cross section of this groove having a form tapered toward the inside of the vessel, and a metal wire calked into the upper part of said groove and consequently under lateral pressure makes a tight closure in this groove, the space outside of this metal wire being filled with solder.

3. In a device for the gas-tight sealing of the cover of a vessel, a vessel, a cover having a conical part forming with the rim of the vessel an annular groove, the upper part of the cross section of this groove tapering toward the inside of the vessel, and a metal wire calked into the upper part of the said groove and consequently under lateral pressure makes a tight closure in this groove, the space outside of this metal wire being filled with solder and the one end of the metal wire being bent outside the groove to facilitate the opening of the sealing by gripping this wire end and winding off the wire.

In testimony that I claim the foregoing as my invention I have signed my name in presence of two subscribing witnesses.

EDUARD RÜEGGER.

Witnesses:
ERNST FISCHER,
ARLON T. ADAMS.